United States Patent

[11] 3,572,827

[72] Inventors Morris C. Merelis
       Brookline;
       Ernest S. Sharaf, West Newton, Mass.
[21] Appl. No. 767,715
[22] Filed Oct. 15, 1968
[45] Patented Mar. 30, 1971
[73] Assignee Pyramid International, Inc.
       Ravenna, Ohio

[54] CHILD'S CAR SEAT
    3 Claims, 6 Drawing Figs.
[52] U.S. Cl. ................................................ 297/253,
          297/256, 297/328, 297/366
[51] Int. Cl. ................................................ A47d 1/10
[50] Field of Search ........................................ 297/250,
          253, 254, 255, 256, 320, 372, 366, 371, 328

[56] References Cited
    UNITED STATES PATENTS
    314,185  3/1885  Knowlton .................... 297/366

| 1,066,033 | 7/1913 | Nauts .......................... | 297/372 |
| 2,208,392 | 7/1940 | Sadler ......................... | 297/256 |
| 2,776,704 | 1/1957 | Moore et al. ................. | 297/457 |
| 3,170,727 | 2/1965 | Peterson ...................... | 297/256 |
| 3,262,736 | 7/1966 | Merelis ........................ | 297/253 |
| 3,338,631 | 8/1967 | Smith et al. .................. | 297/256 |

FOREIGN PATENTS
1,123,784  6/1956  France ........................ 297/256

*Primary Examiner*—Francis K. Zugel
*Attorney*—Thomson & Mrose

ABSTRACT: A child car seat to be attached to an automobile seat. The seat has a supporting frame with legs which engage under the back cushion of the automobile seat. The seat is pivoted on the frame and swings from a sitting position to a reclining position. Lock plate on the sides of the frame have slots which engage pins on the seat. The slots have branches in which the pins engage to lock the seat in a selected position.

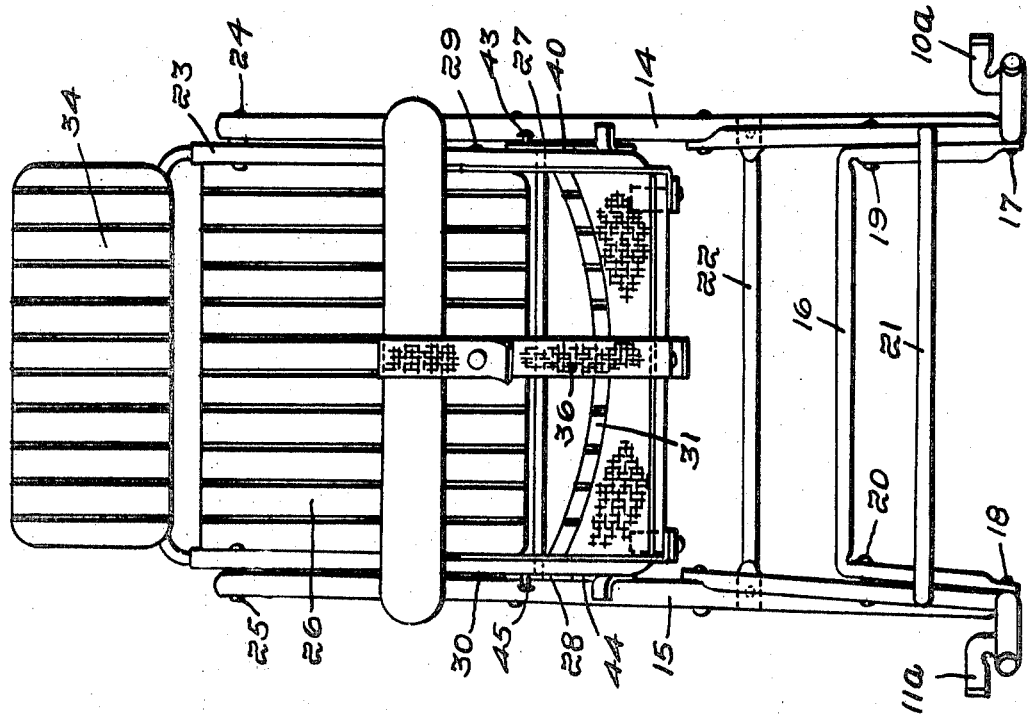
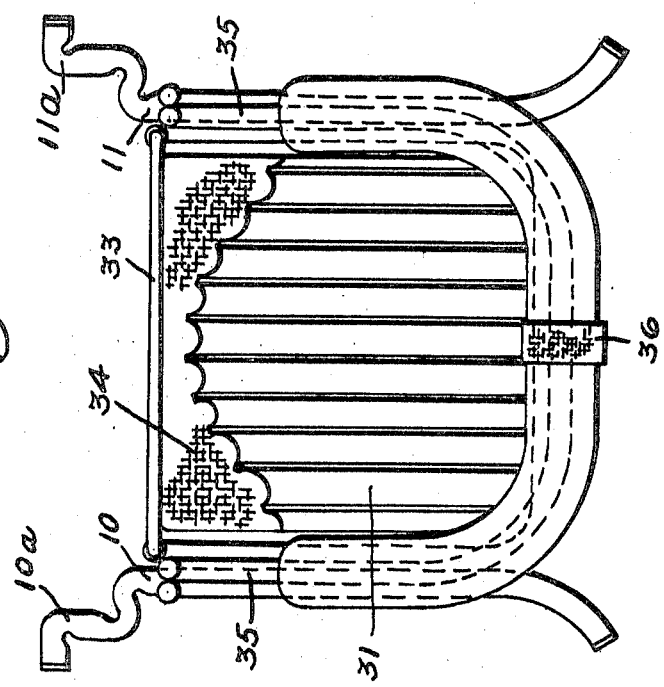

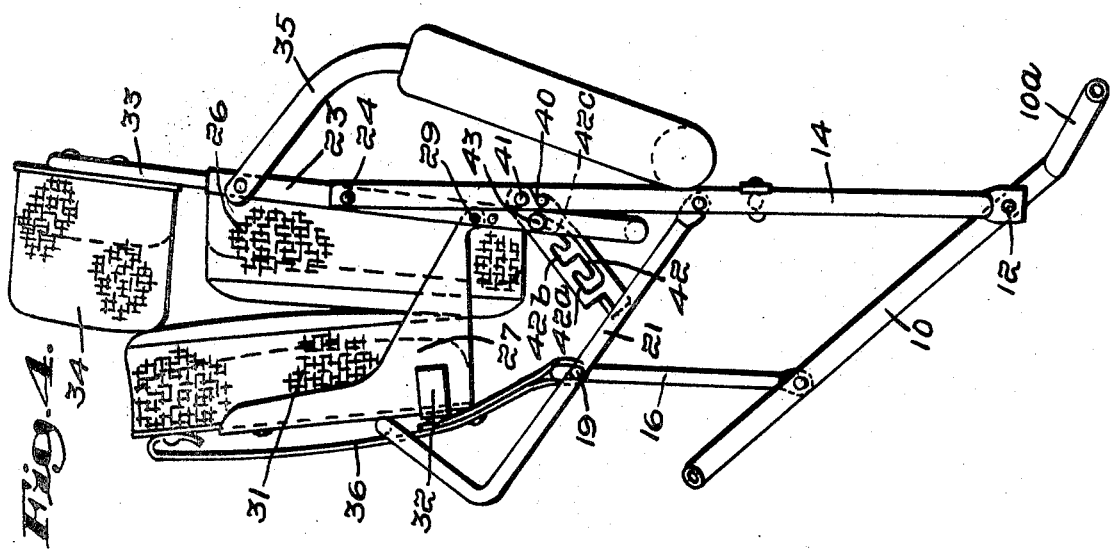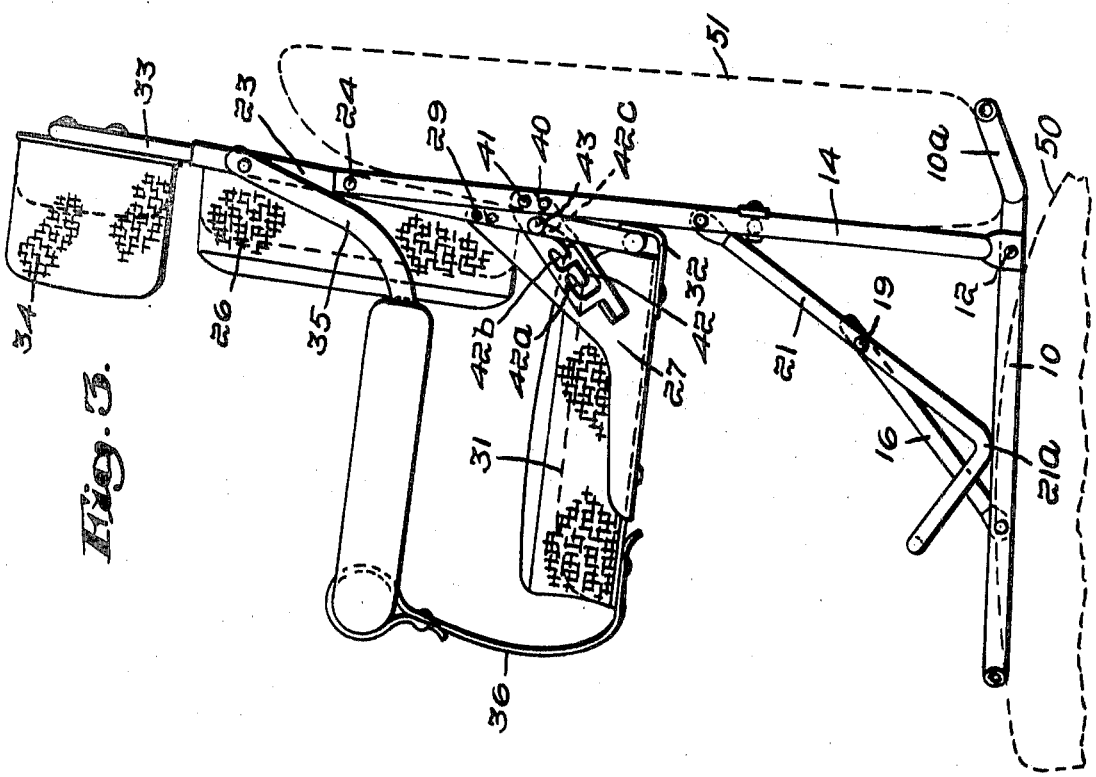

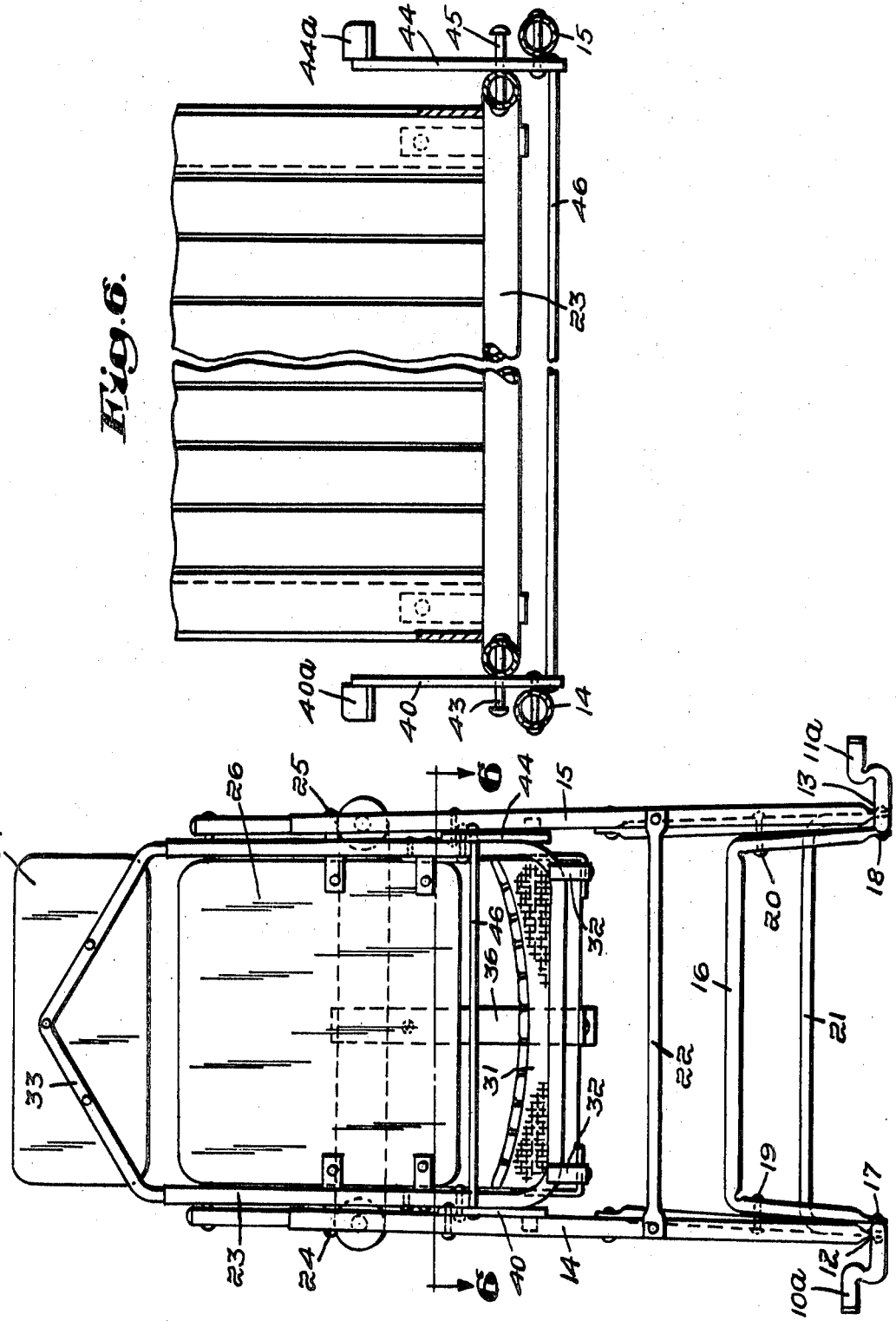

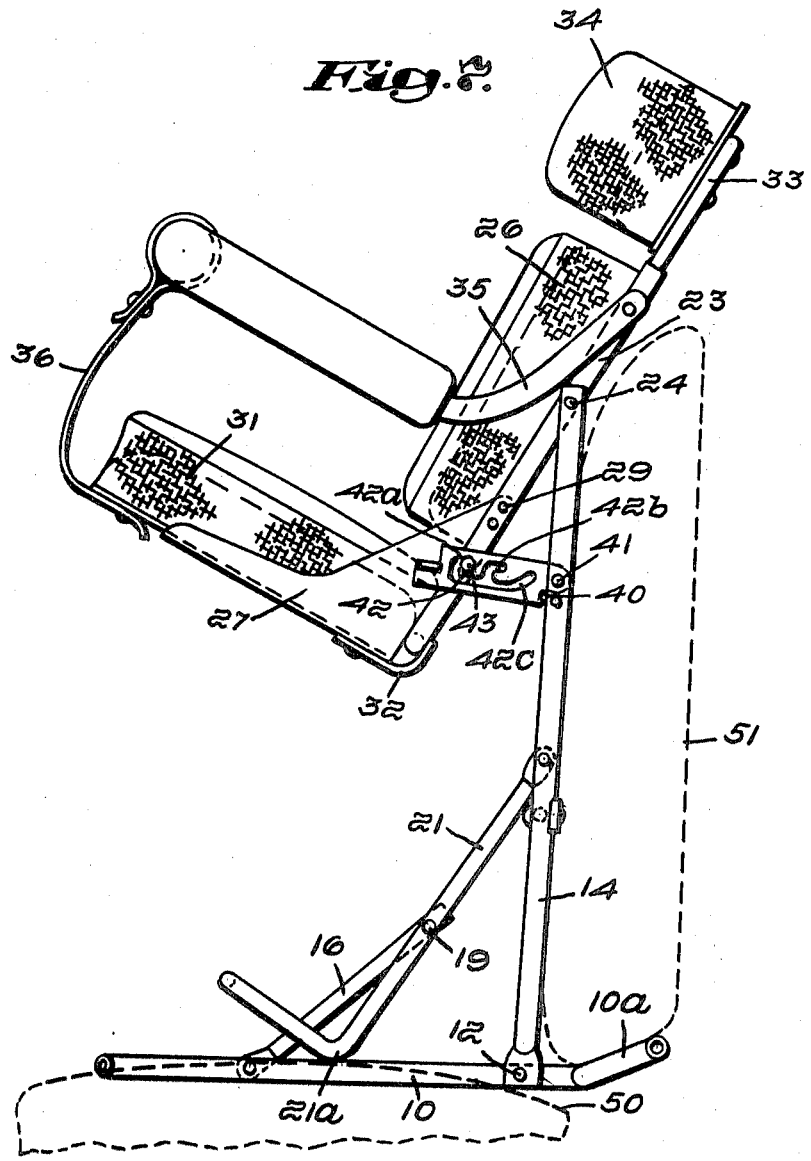

CHILD'S CAR SEAT

BACKGROUND OF THE INVENTION

This invention relates to a child's car seat of the type which can be mounted on the seat of an automobile.

The principal object of the invention is to provide a seat which can be tilted from an upright position to one or more partially reclining positions, and which will lock securely in the position selected. Other object advantages, and novel features will be apparent from the following description.

SUMMARY

The car seat here disclosed has a supporting frame made of metal tubing or similar material, consisting of upright legs hinged to horizontal bottom bars which can be set on the seat of an automobile, and a brace structure adapted to lock the upright legs in raised position. The seat itself has a cushioned back portion hinged to a cushioned seat portion. The back portion is supported by side bars hinged to the upright legs of the frame.

Lock plates are hinged to the upright legs alongside the side portions of the seat frame and have slots in which pins on the side bars are engaged. The slots are shaped with notches into which the pins drop to lock the seat in place. By manually tilting the plates, the pins can be freed from the notches to allow the seat to be tilted to a different position. The plates are connected together by a cross bar and swung in unison.

BRIEF DESCRIPTION OF THE DRAWINGS

In the drawings illustrating the invention:
FIG. 1 is a plan view of a child's car seat constructed according to the invention;
FIG. 2 is a front elevation of the car seat;
FIG. 3 is a side elevation of the car seat in erected position;
FIG. 4 is a side elevation of the car seat in folded position;
FIG. 5 is a rear elevation of the car seat;
FIG. 6 is a cross section, somewhat enlarged, taken along line 6—6 of FIG. 5;
FIG. 7 is a side elevation of the car seat shown in reclining position.

DESCRIPTION OF THE PREFERRED EMBODIMENT

The car seat has a pair of horizontal legs 10 and 11 at the bottom hinged at 12 and 13 to upright legs 14 and 15 respectively. The horizontal legs have extensions 10a and 11a at the rear which fit under the back cushion of an automobile seat, as shown in FIG. 3, to secure the child's seat in place. A U-shaped brace 16 is hinged to legs 10 and 11 at 17 and 18, and also, at 19 and 20, to another U-shaped brace 21 which is in turn hinged at 22 and 23 to legs 14 and 15. Brace 21 is shaped so that, in the erected position, its lower corners 21a engage legs 10 and 11. The dimensions of the brace assembly are selected so that the pivot points 19 and 20 swing past a dead center position to lock the legs 14 and 15 in erected position as shown in FIG. 3. Legs 14 and 15 are rigidly connected together by a brace bar 22. All the legs and brace members are made of metal tubing or similar material.

A U-shaped frame member 23 is mounted to swing on pins 24 and 25 in legs 14 and 15 and supports a cushioned back rest 26. A pair of metal brackets 27 and 28 is swingably mounted at 29 and 30 on frame member 23 and supports a cushioned seat 31. The seat is locked in the open position by a pair of angles 32 pivoted on the bottom of the seat and engaging the bottom part of frame member 23.

An extension frame 33 mounted on the top of frame member 23 supports a head rest 34. A combined arm rest and retaining bar 35 is hinged to frame member 23 and is brought down in front of the child after the child has been placed in the seat. A strap 36 attached to the seat is passed between the child's legs and snapped around the retaining bar.

A plate 40 is pivoted at 41 on leg 14 and has a slot 42 in which a pin 43, mounted on frame member 23, is engaged. Slot 42 has an upwardly curving end portion 42c, and two reentrant portions 42a and 42b. Plate 40 has a sidewardly projecting handgrip 40a. A second plate 44, similar to plate 40, is pivoted at frame member 23 on the opposite side of the seat, and has a slot (not shown) of the same shape as slot 42. Plates 40 and 44 are connected together by a rigid bar 46 and swing together about their respective pivot points.

When the car seat is in use, the supporting framework is in the erected position, as shown in FIGS. 3. Legs 10 and 11 rest on the seat of the automobile, indicated by the dotted outline 50, and extensions 10a and 11a are inserted under the back cushion, indicated by the dotted outline 51. The seat is in the upright position when pins 43 and 45 are in the upper end portions of the slots, that is, 42c and the corresponding slot portion in plate 44. The plates normally fall under gravity to the position illustrated and the upwardly curving configuration of the end portions of the slots serves to lock the seat in the upright position. To tilt it into a partially reclining position plates 40 and 44 may be rotated (clockwise as shown in FIG. 3) by pushing up on either handgrip 40a or 44a. The seat is tilted about pins 24 and 25 until pins 43 and 45 can be slid into one of the reentrant slot portions exemplified by reentrant portions 42a and 42b.

When the pins are in the selected reentrant portions, the seat is locked in tilted position. To return the seat to upright position, plates 40 and 44 are again rotated clockwise and at the same time the seat is tilted slightly more, until the pins are freed from the reentrant portions and returned to the main portions of the slots, so that they can be slid into the upper end portions.

The seat can be folded to compact for when not in use, by swinging the retaining bar 35 over the back, releasing angles 32 from frame member 23 so that the seat 31 can be folded up against the back, and pulling up on brace bar 21. The seat then appears as in FIG. 4. Strap 36 can be fastened around brace bar 16 to hold the seat in folded position.

We claim:

1. A child's car seat comprising a pair of supporting legs, a frame member swingably mounted on said legs, a pair of brackets swingably mounted on said frame member, a seat supported on said brackets and carrying locking means engageable with said frame member for locking the seat thereto, a back rest mounted on said frame member, a pin connected to said frame member, and a plate swingably mounted on one of said legs, said plate having a slot with an upper end portion and a reentrant portion, and said pin projecting into said slot and selectively engageable in said upper end portion and said reentrant portion.

2. A child's car seat as described in claim 1, said locking means comprising an angle swingable into and out of engagement with said frame.

3. A childs's car seat as described in claim 1, having a second plate swingably mounted on the other of said legs, said second plate having a slot with an upper end portion and a reentrant portion, said frame member carrying a second pin projecting into the last-mentioned slot, and a bar interconnecting said plates.